(12) United States Patent
Bennett et al.

(10) Patent No.: US 7,966,304 B2
(45) Date of Patent: Jun. 21, 2011

(54) ENABLING SEARCHING ON ABBREVIATED SEARCH TERMS VIA MESSAGING

(75) Inventors: Jeffery Bennett, San Francisco, CA (US); Tomi Blinnikka, San Pablo, CA (US)

(73) Assignee: Yahoo! Inc., Sunnyvale, CA (US)

( * ) Notice: Subject to any disclaimer, the term of this patent is extended or adjusted under 35 U.S.C. 154(b) by 296 days.

(21) Appl. No.: 11/948,873

(22) Filed: Nov. 30, 2007

(65) Prior Publication Data

US 2009/0144260 A1 Jun. 4, 2009

(51) Int. Cl.
G06F 17/30 (2006.01)
(52) U.S. Cl. .................................................. 707/706
(58) Field of Classification Search .................. 707/3, 5, 707/513, 706; 455/466
See application file for complete search history.

(56) References Cited

U.S. PATENT DOCUMENTS

| | | | |
|---|---|---|---|
| 7,376,636 B1* | 5/2008 | Wang et al. ..................... 707/694 |
| 7,376,640 B1* | 5/2008 | Anderson et al. .................. 707/3 |
| 2002/0052894 A1* | 5/2002 | Bourdoncle et al. .......... 707/513 |
| 2002/0087312 A1* | 7/2002 | Lee et al. ....................... 704/251 |
| 2002/0178152 A1* | 11/2002 | Azzam .............................. 707/3 |
| 2006/0149624 A1* | 7/2006 | Baluja et al. .................... 705/14 |
| 2006/0271522 A1 | 11/2006 | Scott et al. |
| 2007/0050337 A1 | 3/2007 | Venkataraman et al. |
| 2007/0061298 A1* | 3/2007 | Wilson et al. ...................... 707/3 |
| 2007/0192314 A1* | 8/2007 | Heggem .............................. 707/5 |
| 2008/0057987 A1* | 3/2008 | Landschaft et al. .......... 455/466 |

FOREIGN PATENT DOCUMENTS

| | | |
|---|---|---|
| KR | 102000004469 | 7/2000 |
| KR | 102007003431 | 3/2007 |

OTHER PUBLICATIONS

Moore, J., "Are You on the No Fly List, Too?" The Huffington Post, Mar. 2, 2007, 2 pages. http://www.huffingtonpost.com/jim-moore/are-you-on-the-no-fly-lis_b_42443.html.
Goo, Sara K., "Faulty 'No-Fly' System Detailed," The Washington Post, Oct. 9, 2004, 2 pages. http://www.washingtonpost.com/ac2/wp-dyn/A18735-2004Oct8?language=printer.
"Soudex" Wikipedia, the free encyclopedia, 3 pages. http://en.wikipedia.org/wiki/Soundex (accessed Nov. 29, 2007).
"Partial index" Wikipedia, the free encyclopedia, 1 page. http://en.wikipedia.org/wiki/Partial_index (accessed Sep. 25, 2007).

(Continued)

*Primary Examiner* — Etienne P LeRoux
(74) *Attorney, Agent, or Firm* — Frommer Lawrence & Haug LLP; David W. Foster

(57) ABSTRACT

System and method for processing a search query using partial indexing to enable use of abbreviated search terms in the query. A mobile device sends a search request (e.g. a text message) to a server over a network. Search request terms can include subsets of feature identifiers and function as partial indexes. The search request can include additional context (e.g. to indicate desired service such as restaurant or transportation, or additional geographic information). The server matches the terms to an interim search result such as one or more geographic locations, and then provides information regarding the interim result to the mobile device. Partial indexing of a database or of one or more tables of the database (e.g. for a geographic area) can be adjusted to balance a minimum term size (e.g. minimum number of characters) against an average, maximum, or median number of matching locations or services.

21 Claims, 6 Drawing Sheets

OTHER PUBLICATIONS

"8.7. Partial Indexes," SQL.org, PostgreDQL 7.3.4 Documentation, Chapter 8 Indexes, 3 pages. http://www.sql.org/sql-database/postgresql/manual/indexes-partial.html (accessed Nov. 30, 2007).

Tweney, Dylan F., "What is SMS?" SMS 411, Jun. 28, 2006, 2 pages. http://www.sms411.net/2006/06/what-is-sms.html.

Tweney, Dylan F., "Google via SMS," SMS 411, Jul. 20 2006, 4pages. http://www.sms411.net/2006/07/google-via-sms.html.

"Smartphone: Learn to Enter Text and Numbers—Windows Mobile Setup," Microsoft.com, Windows Mobile, 3 pages. http://www.microsoft.com/windowsmobile/gettingstarted/smartphone/text.mspx (accessed Sep. 6, 2007).

Arrington, M., "Jingle Networks Has Now Raised Over $60 million," Techcrunch.com, Oct. 23, 2006, 11 pages. http://www.techcrunch.com/2006/10/23/jingle-networks-has-now-raised-over-60-million/.

"411 SMS™," 2 pages. http://www.411sms.com (accessed Nov. 30, 2007).

"411 SMS™: Simply Making Life Easier (SMiLE)," 3 pages. http://www.411sms.com/easy.php (accessed Nov. 30, 2007).

" 411 SMS™: Free Features," 4 pages. http://www.411sms.com/features (accessed Nov. 30, 2007).

"411 SMS™: Frequently Asked Questions," 4 pages. http://www.411sms.com/faqs (accessed Sep. 22, 2007).

International Preliminary Report on Patentability for International Application No. PCT/US2008/082085 Mailed on Jun. 1, 2010.

* cited by examiner

ENABLING SEARCHING ON ABBREVIATED SEARCH TERMS VIA MESSAGING

FIELD OF ART

The present invention relates generally to searching data and, more particularly, but not exclusively to searching based on multiple abbreviated search criteria via a messaging system, for example a text messaging system.

BACKGROUND

Tremendous changes have been occurring in the Internet that influence our everyday lives. For example, in today's society, mobile computing devices are becoming increasingly more common. Many mobile computing devices, such as personal digital assistants, cellular phones, and the like, may be employed to communicate voice messages, emails, text messages, and so forth, as well as to search for information over the Internet. It is not uncommon to see a person on a bus, train, or even a boat, to be using their mobile devices to search for merchants, restaurants, music, businesses, or the like.

However, performing a search query for user relevant information still remains cumbrous. Often, the user might have to perform several search queries or enter inconveniently large amounts of data in order to obtain relevant search results. Irrelevant search results mean that the user is less likely to find what they are looking for, which in turn may translate into lost opportunities for merchants, or other businesses, to prosper from the user. Therefore, many businesses are searching for new ways to make search results more convenient and relevant to the user.

Search results can be difficult for users to obtain and/or evaluate with electronic devices that have limited data input, output, and/or communication capabilities. For example, some cell phones have a limited keypad, a small screen, and/or text messaging capabilities. Such devices may be limited to processing short text messages, such as Short Message Service (SMS) messages. Even with more capable devices, it is typically time-consuming for a user to manually open a browser, navigate to a search service, submit search terms, and navigate forward and backward through the listed search results. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

Figure 1:
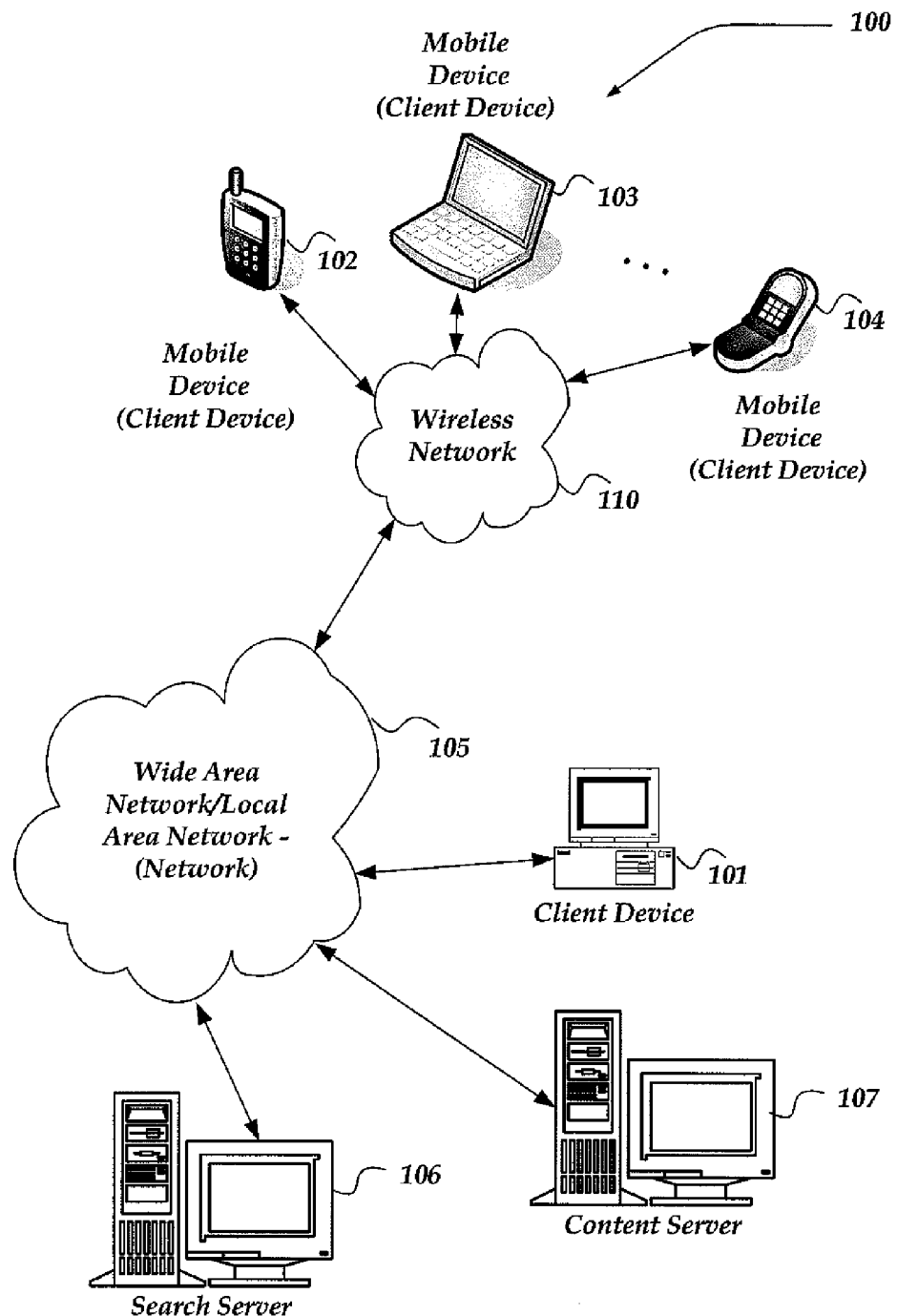
FIG. 1 is a system diagram of one embodiment of an environment in which the invention may be practiced.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Exemplary embodiments of the invention are directed to a system and method for processing a search query submitted via a text message using partial indexing to enable use of abbreviated search terms in the query. A mobile device sends a search request (e.g. a text message) to a server over a network, for example using an SMS code such as an SMS short code. The search request includes subsets or abbreviated search terms. For example, to search for services or other characteristics of an element, a user of the mobile device can indicate the element by abbreviated terms or portions of names features associated with the element. The server matches the abbreviated terms to corresponding names (using for example partial indexing), matches the named features to an element associated with the features, and then provides information regarding the element to the mobile device.

For example, where the element is a geographic location and the desired service is public ground transportation such as buses and/or trains, the features can be cross streets or other landmarks that define or identify (e.g., uniquely) the geographic location. A reply to the search could include bus stops nearby to the intersection or region indicated by the cross streets and schedules of buses stopping at the stops. The abbreviated search terms can be portions of the street names, for example initial letters or consonants of the street names. Thus the server matches the abbreviated terms to the street names, matches or maps the named streets to a geographic location, and then provides desired information relating to that geographic location in a reply SMS message to the user's mobile device.

Information provided by the server in response to a search query can include for example one or more of: a schedule of a nearest bus stop; a nearest restaurant that food of a type specified in the search query (and optionally restaurants that are or will be open at a time specified in the search request, or are open at/will be open near, a time at which the search request is sent); nearby movie theaters and show times of movies with actors and/or titles suggested by the abbreviated search terms of the search request; and so forth. Thus, in exemplary embodiments the abbreviated terms function as partial indexes. Partial indexing of tables of a database (e.g. for a geographic area) can be adjusted to balance a minimum term size (e.g. minimum number of characters) against an average, maximum, or median number of matching locations or services. In addition, compound indexes (e.g., an index that has more than one data-valued subscript, or an index that stores data for more than one field) can be used, for example to further speed the search process. Compound indexing or indexes can use multiple partial indexes, multiple full indexes, or any combination thereof.

The search request can include (implicitly or explicitly) additional context information to focus or enable the search, for example to indicate a desired service such as restaurant or transportation, or additional geographic information such as area code or zip code, or a present or future time, and so forth. The additional context can be provided as one or more subsets or abbreviations of names of the contextual items, and/or can be implicit in the SMS code to which the query is sent.

Context can be implicitly provided by an SMS code or short code to which the text message is sent. In other words, the SMS code can indicate or represent a type of desired service or information. For example, a server or database associated with a given SMS short code can be dedicated to providing a specific kind of service, for example bus schedules for bus routes and bus stops within a geographic area. Thus, when a search query is directed to that SMS short code, the search terms can be used to identify a geographic location and optionally a time of day for which bus information regarding a nearest bus stop should be provided. In another example, if the SMS short code were for the Internet movie database IMDB.com™ then it could be understood that the search relates to movies and/or actors.

Context information can also be gleaned from other characteristics of the search query. For example, a time at which the query is sent or received can be context information, so that a returned bus schedule indicates nearby bus stops having buses scheduled to come within a time window near the search query time.

Context information associated with the mobile device can also be used to refine the search. For example, where the mobile device is a mobile phone, an area code of a telephone number associated with the mobile phone can be used to identify a geographic region in which to search geographic features or landmarks. A known location of a cell phone tower/base station or of a cell that is communicating with the mobile phone can also be used to refine the search, and can for example be automatically provided as part of the search query. A time at which the search query is sent can also be used as context information to refine the search, for example where aspects of a desired service are time-dependent.

In exemplary embodiments the abbreviated search terms indicate geographic location, but other embodiments can enable searches for non-geographic information such as biographic information about a movie actor. The element matched by the server can be independent of geographic location, for example the abbreviated search terms can be partial indexes that identify an actor, author or other kind of person and the additional context information can further indicate a type of information that the user desires, for example a listing of movies starring the actor or books written by the author, and so forth.

In an exemplary embodiment, if a search results in a number of hits that exceeds a threshold, an interim reply to the search query can include a request for additional context or parameter information to narrow or focus the search. The interim reply can include, for example, a code that identifies the original search query when returned with the user's reply to the search engine's request.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes networks that enable communication between client and network devices or servers. A network 105 may comprise one or more local area networks ("LANs") and/or wide area networks ("WANs"). A wireless network 110 may comprise LANs, WANs, telephony networks, or the like. System 100 also includes a general purpose client device 101, mobile client devices 102-104, a search server 106, and content server 107.

One embodiment of mobile devices 102-103 is described in more detail below in conjunction with FIG. 2. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. Such mobile devices may include a messaging client that enables a user to send and receive limited size text messages, but may not enable a user to send or receive long messages, graphics, images, or other content.

In another example, a web-enabled mobile device may have a touch sensitive screen, a stylus, and several lines of color LCD display in which both text and graphics may be displayed. A web-enabled mobile device may include a messaging client and a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. In one embodiment, a user of the mobile device may employ the browser application to exchange text messages that include search queries and search results. A user may also employ a browser application to access additional search result content that is identified in one or more text messages.

Mobile devices 102-104 and client device 101 also may include at least one client application that is configured to provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier. The information may also indicate a content format that the mobile device is enabled to employ. Such information may be provided in a message, or the like, sent to search server 106, client device 101, or other computing devices.

In one embodiment, mobile devices 102-104 and the client device 101 may also provide a physical location to another computing device. In one embodiment, however, mobile devices 102-104 may provide the physical location information in terms of coordinates such as latitude and longitude, or the like. However, mobile devices 102-104 may also provide other information that may be employed to determine a physical location of the device, including for example, a cell tower address, a MAC address, IP address, an area code of a telephone number associated with the mobile device, a physical location of a wide area network or local area network of which the devices 101-104 are a member or participant, or the like. Such location information can be provided in a separate message, sent as part of another message (for example, a query or request from the mobile device for a service), or even as a combination of the above. In one embodiment, physical location information can be provided on demand, or based on a time period (e.g. periodically upon expiration of a recurring or changeable time period), an event, or the like.

Mobile devices 102-104 and client device 101 may further be configured to include a client application that enables the end-user to log into an end-user account that may be managed by another computing device, such as search server 106. Such end-user account, for example, may be configured to enable the end-user to send/receive SMS messages, IM messages, emails, access selected web pages, participate in a social networking activity, perform search queries, or the like. However, performing search queries, participation in various social networking activities, or the like, may also be performed without logging into the end-user account.

Client device 101 may include virtually any computing device capable of communicating over a network to send and receive information, including search query information, location information, social networking information, or the like. The set of such devices may include devices that typically connect using a wired or wireless communications medium such as personal computers, multiprocessor systems, microprocessor-based or programmable consumer electronics, network PCs, or the like. Client device 101 may include a messaging system and/or interface for sending or receiving text messages with mobile devices 102-104 or other client devices.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include cellular networks, mesh networks, Wireless LAN (WLAN) networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies voice or data communications, including data communications that only allow text messaging. Technologies may also include 2nd (2G), 3rd (3G) generation radio access for cellular systems, WLAN, Wireless Router (WR) mesh, and the like. Access technologies such as 2G, 3G, and future access networks may enable wide area coverage for mobile devices, such as mobile devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between mobile devices 102-104 and another computing device, network, and the like.

Network 105 is configured to couple search server 106 and its components with other computing devices, including, mobile devices 102-104, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between search server 106, client device 101, and other computing devices.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media. Computer-readable instructions, data structures, program modules, or other data can be fixed or stored in various storage media, for example Read Only Memory, Random Access Memory, Dynamic Random Access Memory, cache memory, magnetic storage media such as floppy discs or magnetic tape, DVDs, CDs, flash memory, and so forth. The modulated data signal and carrier-wave signal mentioned above can be fixed or stored in such storage media.

One embodiment of search server 106 is described in more detail below in conjunction with FIG. 3. Briefly, however, search server 106 may include any computing device capable of connecting to network 105 to enable data searching, filtering, sorting, and other data management operations. Search server 106 may also provide network portal information and/or services, including providing content and tracking users online behavior with their permission. Search server 106 may further enable aggregation and management of social networking information. Devices that may operate as search server 106 include personal computers desktop computers, multiprocessor systems, microprocessor-based or programmable consumer electronics, network PCs, servers, and the like.

Although FIG. 1 illustrates search server 106 as a single computing device, the invention is not so limited. For example, one or more functions of search server 106 may be distributed across one or more distinct computing devices. For example, managing searches, search results, SMS messages, Instant Messaging (IM) sessions, email messages, sharing of contact information, collecting behavior information, aggregating and/or storing of social networking information, or the like, may be performed by a plurality of computing devices, without departing from the scope or spirit of the present invention.

Content server 107 represents a variety of content and/or other data that may useable on mobile devices 102-104 and/or on client 101. Such content may include text content, web content, audio content, video content, FTP data, or the like. Data services may include, but are not limited to SMS, IM services, email services, services, web services, third-party services, audio services, video services, VOIP services, calendaring services, photo services, or the like. Moreover, information about the content and/or services provided by content server 107 may be employed to provide results to a search query.

Devices that may operate as content server 107 include personal computers desktop computers, multiprocessor systems, microprocessor-based or programmable consumer electronics, network PCs, servers, and the like.

In an embodiment of the invention, a search query can be sent from any of the devices 102, 103, 104, 101 to the search server 106 for processing. The search server 106 can include a database to be searched, or can identify an appropriate remote database that is likely to contain the desired information. For example, the database can be located in or accessed by a different, remote server such as the content server 107, and in that case the search server 106 can communicate with the content server 107 to query the database and then return information to the device that originally sent the query. A reply to the querying device can be sent from the search server 106, or directly to the querying device from the content server 107. In an exemplary embodiment where the search queries are sent via SMS (Short Message Service) to a particular SMS short code (which can for example be associated with specific and/or general databases or services), the mobile device can communicate directly or indirectly with a server that can then communicate via an SMS gateway with a backend service, which can in turn access a database (for example using the partial index terms and context information supplied within or with the SMS message) and then return search results back through the chain. For example, the search server 106 can be such a server that communicates with an SMS gateway via a backend service, and so forth.

Illustrative Mobile Client Environment

Figure 2:
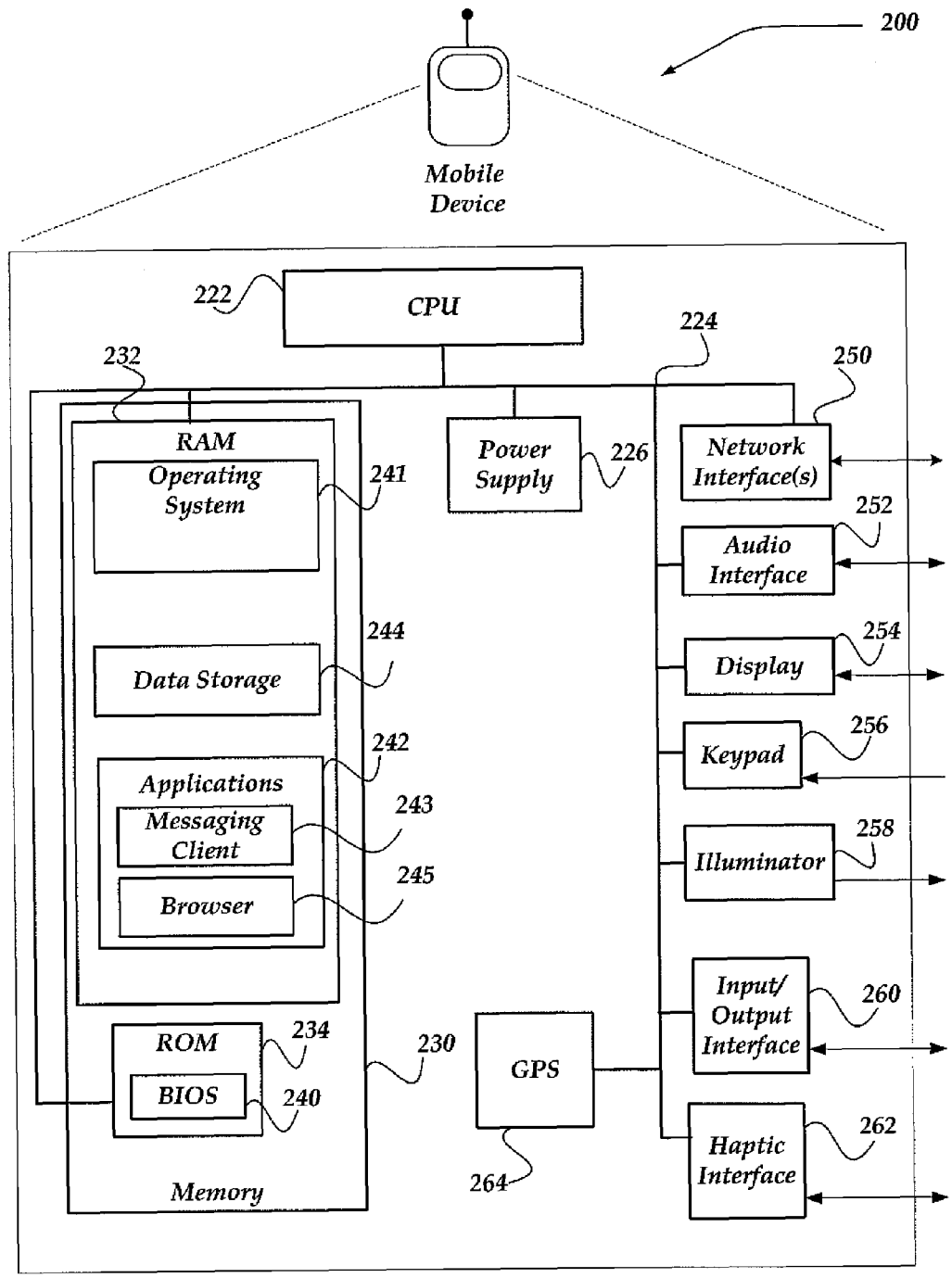
FIG. 2 shows one embodiment of a mobile device that may be included in a system implementing the invention.

FIG. 2 shows one embodiment of mobile device 200 that may be included in a system implementing the invention. Mobile device 200 may include many more or less components than those shown in FIG. 2. However, the components shown are sufficient to disclose an illustrative embodiment for practicing the present invention. Mobile device 200 may represent, for example, one embodiment of at least one of mobile devices 102-104 of FIG. 1.

As shown in FIG. 2, mobile device 200 includes a central processing unit (CPU) 222 in communication with a mass memory 230 via a bus 224. Mobile device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to mobile device 200. A rechargeable or non-rechargeable battery may be used to provide power. The power may also be provided by an external power source, such as an AC adapter or a powered docking cradle that supplements and/or recharges a battery.

Mobile device 200 may optionally communicate with a base station (not shown), or directly with another computing device. Network interface 250 includes circuitry for coupling mobile device 200 to one or more networks, and is constructed for use with one or more communication protocols and technologies including, but not limited to, global system for mobile communication (GSM), code division multiple access (CDMA), time division multiple access (TDMA), GPRS, SMS, WAP, user datagram protocol (UDP), transmission control protocol/Internet protocol (TCP/IP), general packet radio service, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial pad. Keypad 256 may also include a keyboard or command buttons that are associated with taking and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions. In another embodiment, illuminator 258 may comprise a flash for a built-in camera (not shown).

Mobile device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate mobile device 200 in a particular way when another user of a computing device is calling.

Optional GPS transceiver 264 can determine the physical coordinates of mobile device 200 on the surface of the Earth, which typically outputs a location as latitude and longitude values. GPS transceiver 264 can also employ other geo-positioning mechanisms, including, but not limited to, triangulation, assisted GPS (AGPS), Enhanced Observed Time Difference (E-OTD), cell identifier (CI), service area identifier (SAI), enhanced timing advance (ETA), base station subsystem (BSS) or the like, to further determine the physical location of mobile device 200 on the surface of the Earth. It is understood that under different conditions, GPS transceiver 264 can determine a physical location within millimeters for mobile device 200; and in other cases, the determined physical location may be less precise, such as within a meter or significantly greater distances. In one embodiment, however, the mobile device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of mobile device 200. The mass memory may also store an operating system 241 for controlling other operations of mobile device 200. It will be appreciated that this component may include a specialized client communication operating system such as Windows Mobile™, or the Symbian® operating system, or a general purpose operating system such as a version of UNIX, or LINUX™. The operating system may include, or interface with a Java virtual machine module that enables control of hardware components and/or operating system operations via Java application programs.

Memory 230 further includes one or more data storage 244, which can be utilized by mobile device 200 to store, among other things, applications 242 and/or other data. For example, data storage 244 may also be employed to store information that describes various capabilities of mobile device 200. The information may then be provided to another device based on any of a variety of events, including being sent as part of a message or part of a header during a communication, sent upon request, or the like. Moreover, data storage 244 may also be employed to store search data, user preferences, address books, buddy lists, aliases, social networking information, or the like. At least a portion of the information may also be stored on a disk drive or other storage medium (not shown) within mobile device 200.

Applications 242 may include computer executable instructions which, when executed by mobile device 200, provide a plurality of services, including contact managers, task managers, calendars, games, VOIP applications, transcoders, database programs, word processing programs, security applications, spreadsheet programs, and so forth. Applications 242 generally include a messaging client 243 that causes mobile device 200 to transmit, receive, and/or otherwise process messages (e.g., SMS, MMS, IM, email, and/or other messages), audio, video, and enable telecommunication with another user of another client device.

Another example of application programs includes a browser 245, which may include virtually any application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web based languages may be employed.

In one embodiment, messaging client 243 or browser 245 may be configured to enable access to a search application, such as might be available through search server 106 and/or content server 107 of FIG. 1. In one embodiment, a user of mobile device 200 may input to the search application a variety of search terms for use in obtaining a search results. Mobile device 200 may also provide location information, or information useable in determining its physical location. Such information, may, in one embodiment, be useable to automatically (e.g., transparent to a user input) modify the search query.

In accordance with exemplary embodiments, text search queries containing one, two, three or more abbreviated search terms and optionally additional context information can be sent via SMS to a specific or general SMS short code (e.g. via the messaging client 243), or can alternatively be provided to a database through any other communication application and corresponding protocol(s) of the mobile device 200, including for example the browser 245.

Illustrative Server Environment

Figure 3:
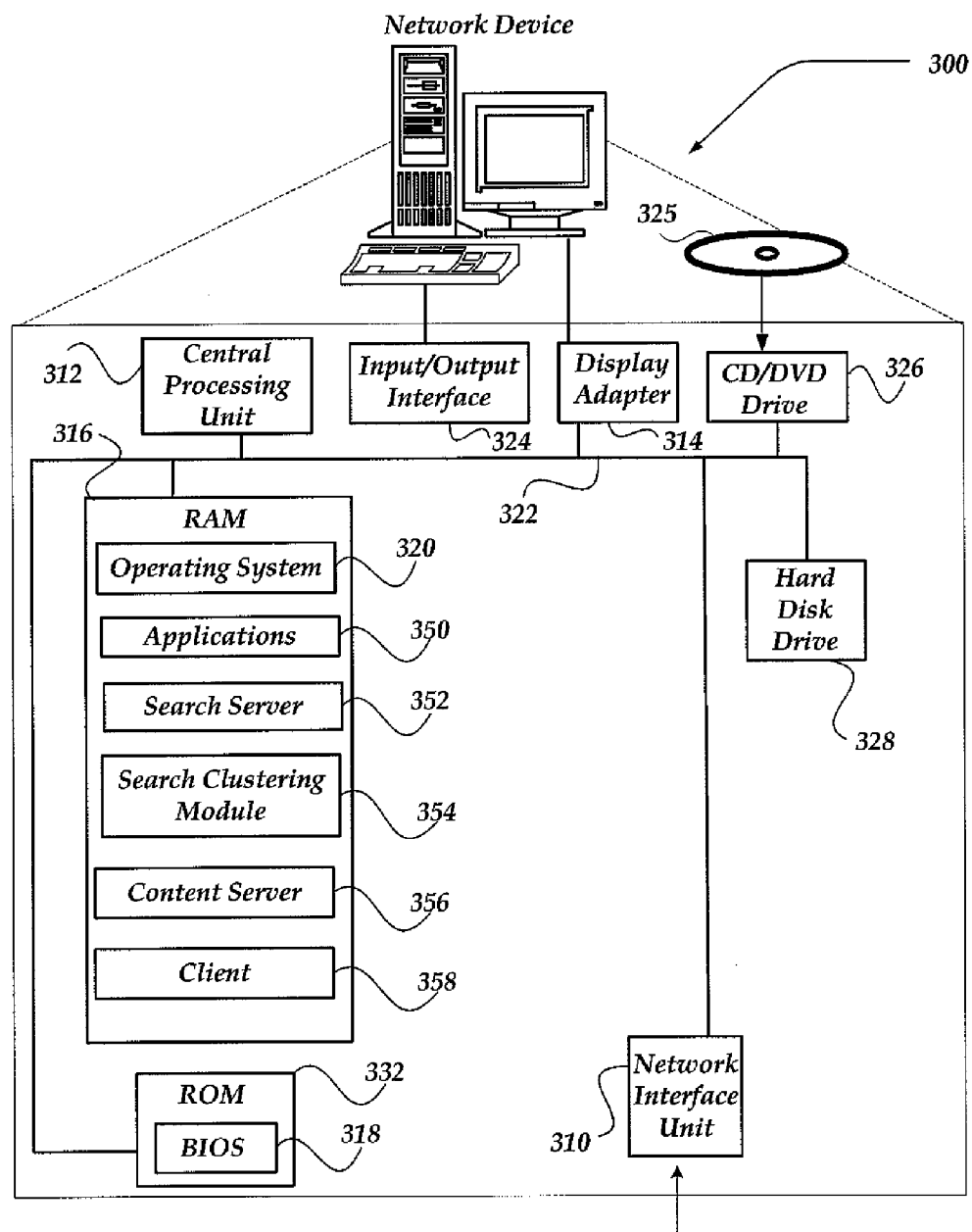
FIG. 3 shows one embodiment of a network device that may be included in a system implementing the invention.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, search server 106 and/or content server 107 of FIG. 1.

Network device 300 includes a central processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs may include SMS message servers, IM message servers, email servers, transcoders, schedulers, calendars, database programs, word processing programs, HTTP programs, customizable user interface programs, IPSec applications, encryption programs, security programs, VPN programs, account management and so forth. A search module 352 may also be included as an application program within applications 350 or as a separate application.

Search module 352 is configured to receive search terms from client devices, determine other search parameters, perform searches of data sources, provide search results, and perform other search related operations. Search module 352 may employ a process substantially similar to that described below.

The mass memory can also include content server software 356 (e.g., an application program within applications 350 or as a separate application), for example so that the network device 300 can perform as, or perform functions of, the content server 107 shown in FIG. 1. The mass memory can also include a client module 358, for example so that the network device can perform as, or perform the functions of, the client device 101 shown in FIG. 1.

Generalized Operation

As noted herein, exemplary embodiments are directed to a system and method for processing a search query submitted via a text message using partial indexing to enable use of abbreviated search terms in the query. In addition, compound indexes (e.g., an index that has more than one data-valued subscript, or an index that stores data for more than one field) can be used, for example to further speed the search process. Compound indexing or indexes can use multiple partial indexes, multiple full indexes, or any combination thereof.

The features variously described below and elsewhere herein can be performed using the apparatus shown in FIGS. 1-3, and can be variously implemented in the exemplary process shown in FIG. 4 and described further below.

In an exemplary embodiment, a device such as the mobile device 102, 103, 104 or client device 101 sends a search request (e.g. a text message) to a server (e.g. server 106) over a network (e.g. 105, 110), for example using an SMS code such as an SMS short code. The search request includes subsets or abbreviated search terms, and the search request or the SMS code to which the text message is sent indicates the desired object of the search. The search request can additionally or alternatively be sent to (and/or include) a short code associated with a different type of communication service or protocol than SMS.

The search request can be in the form of, and/or conveyed via, a text message, a Short Message Service (SMS) message, an Instant Message (IM), Multimedia Messaging Service (MMS), Wireless Access Protocol or Wireless Application Protocol (WAP), or speech that is received and processed into corresponding text or alphanumeric characters, and so forth.

In exemplary embodiments, to search for services or other characteristics of an element, a user of the mobile device can indicate the element by abbreviated terms or portions of names features associated with the element. The server matches the abbreviated terms to corresponding names in a database (by applying, for example, partial indexing and optionally compound indexing to tables of the database), matches the named features to an element associated with the features, and then provides information regarding the element to the mobile device. In an exemplary embodiment, SQL's (Structured Query Language) ability to perform partial indexing is used in association with the database. Thus, in exemplary embodiments the abbreviated terms function as partial indexes.

In exemplary embodiments three characters is the length of the abbreviated terms, or is the number of initial characters of a search term that the server uses to perform the search. Additional characters entered by a user can be ignored, at least until the search is deemed unsuccessful or has too many hits in which case the server can search again using one or more of the additional characters, e.g. search again this time using the first four characters. In an exemplary embodiment, if a search results in a number of hits that exceeds a threshold, an interim reply to the search query can include a request for additional context or parameter information to narrow or focus the search. This requested additional information can be an additional parameter or search term, and/or can be additional information appended to a previously submitted search term, for example more letters of a street's name. The interim reply can also include, for example, a code that identifies the original search query when returned with the user's reply to the search engine's request, to aid the search engine.

Other lengths than three characters can be used or specified for one or more of the abbreviated terms in a search query, depending for example on the number of parameters in the search query (greater number of parameters can mean that fewer characters in each parameter are needed to identify full parameter names and a corresponding element, e.g. geographical location, associated with all the parameters) and the complexity and scope of the database. For example, if the search includes street names and the database being queried covers a large city or multiple cities then more information (greater number of parameters and/or greater minimum length of the abbreviated search terms) may be needed to accurately identify the location that the user is trying to describe via the abbreviated search terms.

In accordance with exemplary embodiments, partial indexing of a database (e.g. partial indexing of tables of a database for a geographic area) can be adjusted to balance a minimum term size (e.g. minimum number of characters) against an average, maximum, or median number of matching locations or services. For example, in a geographically indexed database the abbreviated term size can be increased until a particular number of different terms (e.g. two, or three terms representing abbreviated street names) results in a unique (or unknown/invalid) geographical location for each set of terms. This can be adjusted to expand or narrow the size of the geographic location (e.g. street corner, block, set of adjacent blocks, city district, city, . . . and so forth) and/or a non-zero number of non-unique geographic locations or maximum hits that could occur for a single search query within the database (e.g., results in no more than three hits or different locations from a single search query). Smaller indexes/shorter abbreviations for partial indexing can result in smaller database footprints that require fewer resources, but this can balance against inconvenience to a user of having to sort or select among multiple hits or search results.

In a particular example, a couple in San Francisco desires to catch a bus to a different part of town to eat at a seafood restaurant. One of them notices that they are at the corner of Geary Boulevard and Arguello Boulevard, activates her cell phone, and composes a text message containing "gea arg" (the first three characters of each street name) and sends the message to an SMS short code for a server with a database of San Francisco bus routes. The server implicitly knows by the SMS short code that the cell phone user desires locations of nearby bus stops and by default assumes that the user also desires schedule information for those bus stops for a time window including the present time of the message (e.g., from the message time until 30 minutes into the future, or until a first bus will arrive if none are scheduled to arrive within 30 minutes). The user could also indicate a number plus an am or pm designation to indicate a time for the window to start, e.g. "7 pm", and could follow or precede that designation with a desired time span of the window (e.g., "70 m" or "1 h" to indicate minutes or hours). The user could also indicate another nearby cross street or a zip code. For example, Stanyan Street is nearby, so the search query could be "gea arg sta", or "gea arg 94143". In an exemplary embodiment the abbreviated terms can simply be initial consonants, and the terms can be mixed (some with vowels, some without), e.g.: "gea arg stn" to indicate Geary, Arguello, and Stanyan. In an embodiment, the server can simply ignore vowels in a search term, and/or prompt the user to enter (or re-enter) only consonants.

Additional information can override other assumed information, for example if the user is a traveler visiting a foreign city and is using a cell phone having an area code different from the city area code, specifying a local area code of the foreign city in the search query can tell the server that the user wants to search the foreign city and not a home city of the cell phone. The server's reply can include for example a location of one or more nearby bus stops, a distance and/or estimated walking time to each bus stop, rudimentary directions, and bus schedule/destination information for each bus stop. The information can be ordered by bus stop and the bus stops can be ordered in the reply message by arrival time of a next bus, or by distances to the bus stops, or by a weighted combination of both factors, and so forth.

Other things besides bus route information can be sought, for example: a nearest restaurant serving a particular type or kind of food; nearby movie theaters and corresponding movies/show times; and so forth. In some embodiments the abbreviated search terms indicate geographic location, but other embodiments can enable searches for non-geographic information such as biographic information about a movie actor. The element matched by the server can be independent of geographic location, for example the abbreviated search terms can be partial indexes that identify an actor, author or other kind of person and the additional context information can further indicate a type of information that the user desires, for example a listing of movies starring the actor or books written by the author, and so forth.

As noted herein, the search request can include (implicitly or explicitly) additional context information to focus or enable the search, for example to indicate a desired service such as restaurant or transportation. Additional geographic information can also (or alternatively) be provided in full or abbreviated form, such as telephone area code, zip code, city name, geographic landmark (a named park, pier, district, mall, store or other business present at or near the location, etc.). A present or future time, and/or a time window or interval, can additionally or alternatively be provided. The additional context can be provided fully named or as one or more subsets or abbreviations of names of the contextual items, and/or can be implicit in the SMS code to which the query is sent. A time at which the search query is sent can also be used as context information to refine the search, for example where aspects of a desired service are time-dependent. For example, a time at which the query is sent or received can be context information, so that a returned bus schedule indicates nearby bus stops having buses scheduled to come within a time window near the search query time, or a query for nearby theaters showing a particular movie might filter out show times starting before a time at which the query was sent.

Context can be implicitly provided by an SMS code or short code to which the text message is sent. In other words, the SMS code can indicate or represent a type of desired service or information. For example, a server or database associated with a given SMS short code can be dedicated to providing a specific kind of service, for example bus schedules for bus routes and bus stops within a geographic area. Thus, when a search query is directed to that SMS short code, the search terms can be used to identify a geographic location and optionally a time of day for which bus information regarding a nearest bus stop should be provided. In another example, if the SMS short code were for the Internet movie database IMDB.com™ then it could be understood that the search relates to movies and/or actors.

Context information associated with the mobile device and not entered by the user as text in the search query, can also be used to refine the search. For example, where the mobile device is a mobile phone, an area code of a telephone number associated with the mobile phone can be used to identify a geographic region in which to search geographic features or landmarks. A known location of a cell phone tower/base station or of a cell that is communicating with the mobile phone can also be used to refine the search, and can for example be automatically provided as part of the search query.

Figure 4:
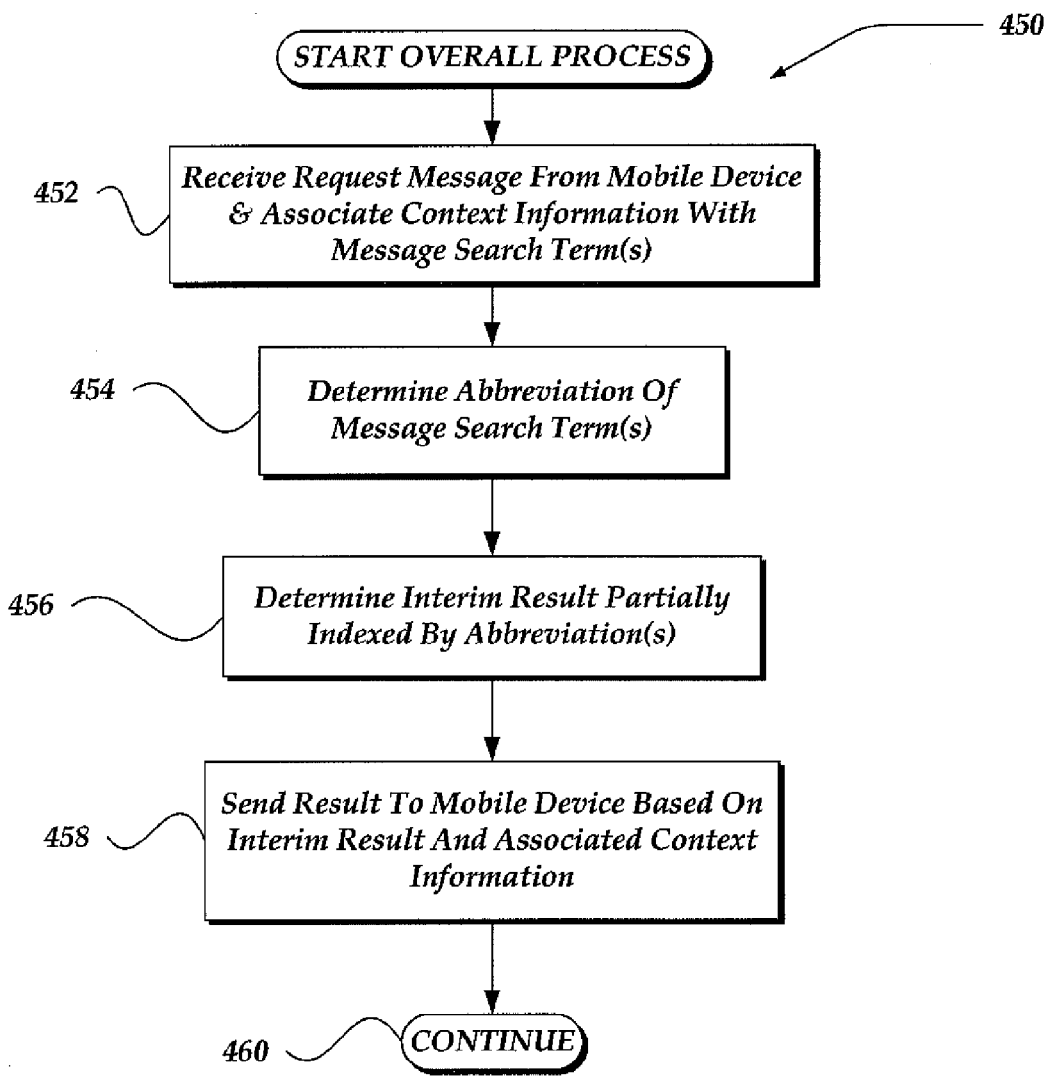
FIG. 4 illustrates a logical flow diagram generally showing one embodiment of an overall process for obtaining search results through a messaging system.

FIG. 4 illustrates operation of certain aspects of the invention and shows a logical flow diagram of an exemplary process 450 that encompasses various aspects and features of the invention described herein. Control begins and moves to block 452, where a server receives from a client device (which can be a desktop device or a mobile device such as a cell phone, laptop computer, Blackberry™, etc.) a search request message that includes one or more search terms, which can for example include abbreviated search terms such as the first three letters of a street name. The server associates context information with the search term(s). The context information can be part of the search query, such as a zip code in the search query, letters from an additional street name, or an area code. The context information can help identify a physical location, or can include information that indicates a type or quality of service or other characteristic that the user desires, for example a time or time window for public transportation opportunities, or a desired type of restaurant food. The context information can be implicit, for example an area code associated with the mobile device sending the query, a location of a wireless communication tower that receives a wireless signal from the mobile device, can be associated with an SMS code or short code to which the query is sent or addressed, and so forth.

From block 452 control proceeds to block 454, where abbreviations of search terms in the search request message are determined. The search terms can be in abbreviated form in the search request, for example a search term can consist of the first three letters of a street name, or the first three consonants of a street name or any subset of the street name. Thus, the server can determine abbreviations by recognizing that the search terms are already in abbreviated form. In an exemplary embodiment, the server can additionally or alternatively determine an abbreviation of a search term by ignoring parts of the search term, for example by ignoring vowels in the search term, or ignoring last characters in the search term, for ignoring the last two characters in a five character search term. For example, "geary" can be abbreviated to "gea" or "gry". The determined abbreviations can be partial indexes as described herein.

From block 454 control proceeds to block 456, where one or more interim results are determined or identified based on the determined abbreviations, and where appropriate based also the context information. The abbreviations or abbreviated search terms can function as partial indexes to indicate the interim result. For example, where the abbreviated search terms and the context information indicate street names, one or more geographical locations is identified or defined by the combination of the corresponding streets. Some cities or locations have multiple streets with the same names and it is also possible that an abbreviated search term can be associated with multiple, different streets (e.g., "gea" can correspond to both Geary Boulevard and Geary Road, or to Gearhead Alley, in a hypothetical situation). Thus, it is possible that the interim result can include multiple hits or elements, that are identified based on the abbreviated search terms and optionally the context information.

Control proceeds from block 456 to block 458. In block 458, a result based on the interim result and the context information is provided to the mobile or client device. The context information can indicate a type of the result. For example, where the context information is an SMS short code of a database associated with a particular service (such as bus routes and schedules in San Francisco), the result can indicate service available at a geographic location identified by or associated with or identified by search terms in the search request message (e.g., bus stops and bus arrival/departure times near the geographic location).

From block 458 control proceeds to block 460, where the process continues, for example by returning to block 452 or by proceeding to other functions.

Figure 5:
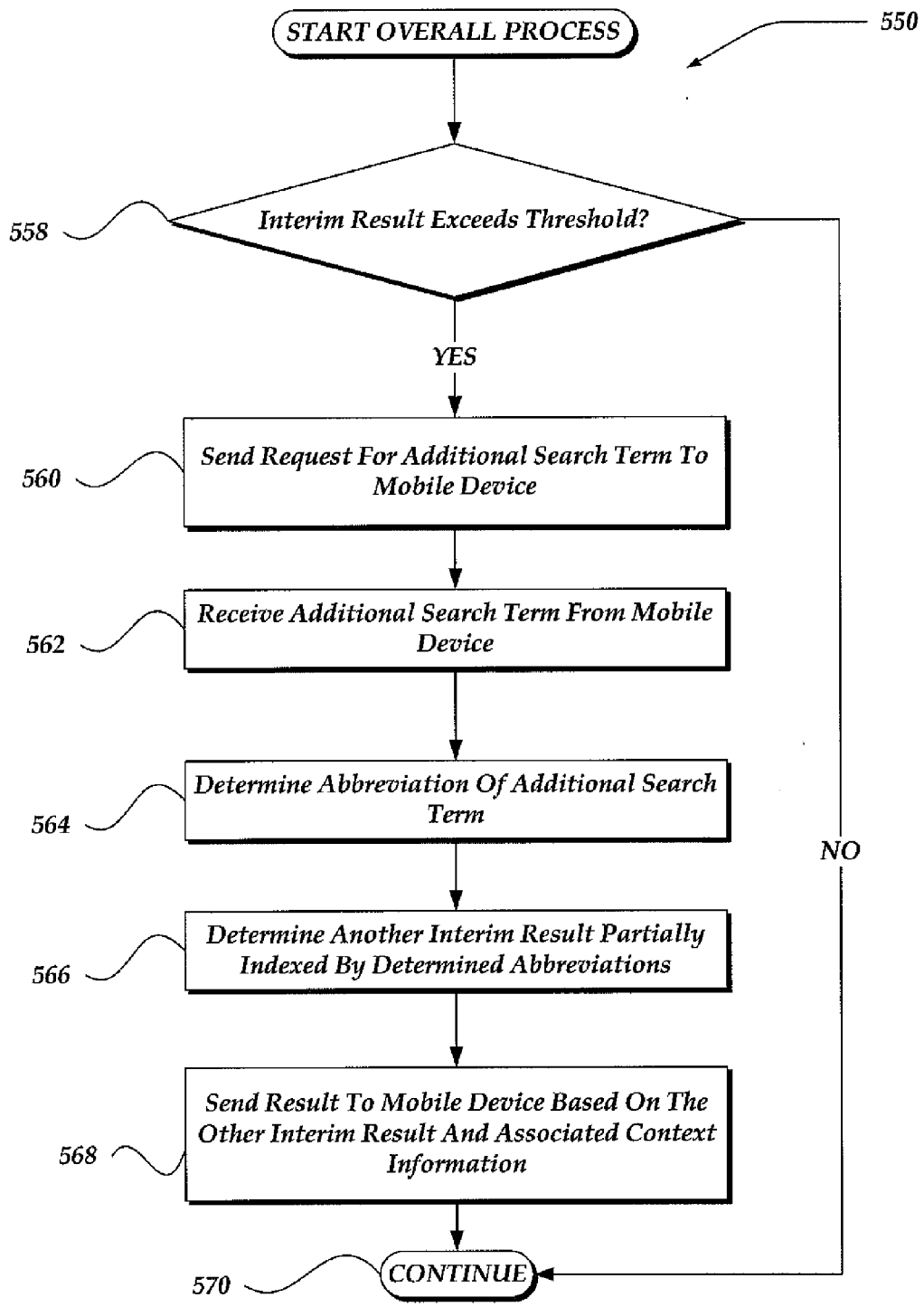
FIG. 5 illustrates a logical flow diagram generally showing another embodiment for obtaining search results through a messaging system.

FIG. 5 illustrates additional features or functions that can be provided in exemplary embodiments, for example after or in conjunction with block 456 of FIG. 4. For example, block 458 of FIG. 4 can be replaced with the sequence shown in FIG. 5. Alternatively, the result of block 568 can include the request of block 560.

As shown in block 558 of FIG. 5, a determination can be made whether a number of hits or elements in the interim search result (determined in block 456) exceeds a threshold, for example a predetermined threshold. For example, if the interim result indicates more than three different, distant geographic locations (the threshold in this example being three), then the server can request additional information from the client device in order to narrow the search and thereby provide more useful results to the client device (e.g. mobile device). Thus, if the determination in block 558 is negative, then control proceeds to block 570, where the process continues, for example by returning to block 458 or by proceeding to other functions.

If the determination in block 558 is positive, then control proceeds to block 560, where the server sends a request back to the client device or mobile device for additional information, for example one or more additional search terms or context information. In an exemplary embodiment, the result in block 458 can include such a request.

Control proceeds from block 560 to block 562, where the server receives additional information such as one or more additional search terms or additional context information. From block 562 control proceeds to From block 564 control proceeds to block 566, where a second interim result is determined, in much the same fashion as in block 456, but this time taking into account the additional information. From block 566 control proceeds to block 568, where a result is provided to the mobile device, and the result is based on the other interim result and associated context information (for example the context information initially received, and optionally also additional context information received in response to the query of block 560) in a similar fashion as described with respect to block 458.

Figure 6:
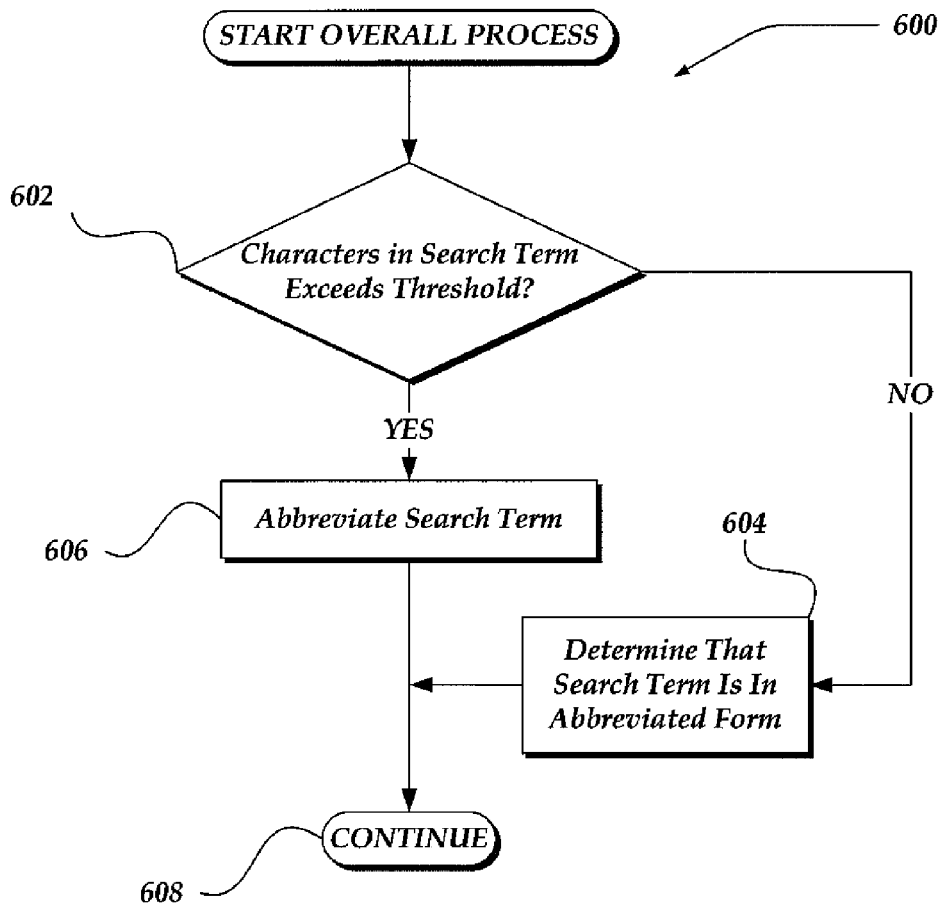
FIG. 6 illustrates a logical flow diagram of an example process for determining message search term abbreviations.

FIG. 6 illustrates an example implementation of block 454 of FIG. 4. As shown in FIG. 6, in block 602 a determination is made whether a number of characters in a search term exceeds a threshold value. As outlined elsewhere herein, this threshold can for example be three, but can also be a lesser or greater value than three. The threshold can represent a number of any characters, or can represent a number of a particular kind of character, for example consonants, numerals, or vowels, and so forth. If in block 602 it is determined that the number does not exceed the threshold, then control proceeds to block 604 where a determination is made that the search term is already in abbreviated form. From block 604 control proceeds to block 608, where the process continues, for example to block 456 of FIG. 4, or back to block 602 if there are more search terms to be evaluated, or to another process or function.

If in block 602 it is determined that the number of characters (or number of characters of a certain type) in the search terms exceeds the threshold, then control proceeds to block 606 where the search term is abbreviated. From block 606 control proceeds to block 608, where the process continues, for example to block 456 of FIG. 4, or back to block 602 if there are more search terms to be evaluated, or to another process or function.

In block 606 the search term can for example be abbreviated by simply omitting any characters following the first threshold number of characters in the term (e.g. "geary" abbreviated to "gea" where the threshold value is three) or by omitting any characters preceding the last threshold number of characters in the term (e.g. "geary" abbreviated to "ary"). Alternatively, the search term can be abbreviated by omitting characters of a certain type from the search term from the beginning of the search term or from the end of the search term (e.g. "stinson" to "ison" or "stion" where the certain type is consonant and the threshold value is three), or by omitting all characters of the certain type. Abbreviation techniques can also be variously combined to perform the abbreviation, for example by omitting all characters of a certain type and then omitting any remaining characters that exceed the threshold value (e.g., "stinson" to "stnsn" to "stn" or "nsn" where the type is vowel and the threshold value is three). Other methods or techniques of abbreviation can be used, including but not limited to substituting an identified word with an abbreviation that is commonly accepted within the applicable language, and/or culture or locale (e.g. "boulevard" abbreviated to "blvd" or "limited" to "ltd" or "pounds" to "lbs", and so forth).

In example embodiments, the process of FIG. 6 can be applied to each search term in the search request message. Alternatively the process of FIG. 6 can be applied to only some of the contents of the search request message, for example up to but not exceeding a threshold number of search terms, for example up to the first four search terms, but not to any additional search terms that may be present in the search request message. Other threshold values can be used that are lesser or greater than four.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent is:

1. A method of performing a search over a network, comprising:
    sending, from a mobile device to a server, a search request message that comprises at least one search term comprising an abbreviation, wherein the server associates context information with the at least one search term, and wherein the abbreviation is operative as a partial index;
    determining an interim result corresponding to the abbreviation by indexing the abbreviation into a partial index, the interim result comprising a name; and
    providing a result to the mobile device based on at least the interim result and the context information.

2. The method of claim 1, wherein the interim result comprises a geographic location.

3. The method of claim 1, wherein the context information specifies a type of the result provided to the mobile device, wherein the type comprises at least one of a restaurant food specialty or transportation schedule information.

4. The method of claim 1, wherein the search request text message comprises a short code associated with a type of a service and wherein the result provided to the mobile device indicates a geographic location associated with the type of service.

5. The method of claim 1, wherein the context information comprises an area code for a telephone number associated with the mobile device.

6. The method of claim 1, comprising:
    determining whether the interim result exceeds a threshold;
    if the determining indicates that the interim threshold exceeds the threshold, requesting at least a second search term;
    receiving at least the second search term from the mobile device;
    determining a second abbreviation of the at least second search term, wherein the second abbreviation is operative as a second partial index;
    determining a second interim result that is indexed by at least the partial index and the second partial index; and
    providing the result to the mobile device based on at least the second interim result and the context information.

7. The method of claim 1, wherein the search term consists of one or more abbreviations.

8. A computer readable storage medium comprising instructions for causing a computer to perform:
    receiving, from a mobile device, a search query that comprises at least one search term comprising an abbreviation, and associating context information with the at least one search term, wherein the abbreviation is operative as a partial index;
    determining an interim result corresponding to the abbreviation by indexing the abbreviation into a partial index, the interim result comprising a name; and
    providing a result to the mobile device based on at least the interim result and the context information.

9. The computer readable storage medium of claim 8, wherein:
    the interim result comprises a plurality of geographic locations; and
    the medium comprises instructions for causing the computer to select at least one of the plurality of geographic locations based on a geographic distance between the selected at least one geographic location and a determined geographic location of the mobile device; and
    the result comprises information regarding the selected at least one geographic location.

10. The medium of claim 8, wherein the search query comprises a short code.

11. The medium of claim 8, wherein the medium comprises instructions for causing the computer to perform:
    determining whether the interim result exceeds a threshold;
    if the determining indicates that the interim threshold exceeds the threshold, then requesting at least a second search term;
    determining a second abbreviation of the at least second search term, wherein the second abbreviation is operative as a second partial index;
    determining a second interim result that is indexed by at least the partial index and the second partial index; and
    providing a result to the mobile device based on at least the second interim result and the context information.

12. A network device arranged to respond to a search request message from a mobile device over a network, comprising:
    a transceiver to send and receive data over the network; and
    a processor that is configured to:
        identify at least one search term in the search request message comprising an abbreviation and associate context information with the at least one search term, wherein the abbreviation is operative as a partial index;

determine an interim result corresponding to the abbreviation by indexing the abbreviation into a partial index, the interim result comprising a name;

provide a result to the mobile device based on at least the interim result and the context information.

13. The network device of claim 12, wherein the interim result comprises a geographic location.

14. The network device of claim 12, wherein the context information specifies a type of the result provided to the mobile device.

15. The network device of claim 12, wherein the search request message comprises a short code associated with a type of a service and the result provided to the mobile device indicates a geographic location associated with the type of the service.

16. The network device of claim 12, wherein the search request message comprises a telephone area code associated with the mobile device.

17. A system that is operative to manage a search over a network, comprising:

a mobile device that is configured to send a search request message over the network and receive a search result in response to the query;

a network device that is configured to:

receive the search request message;

identify at least one search term comprising an abbreviation in the search request message and associate context information with the at least one search term, wherein the abbreviation is operative as a partial index;

determine an interim result corresponding to the abbreviation by indexing the abbreviation into a partial index, the interim result comprising a name;

provide a result to the mobile device based on at least the interim result and the context information.

18. The system of claim 17, wherein the network device is configured to:

determine whether the interim result exceeds a threshold;

if the determination indicates that the interim threshold exceeds the threshold, then request at least a second search term;

determine an abbreviation of the at least second search term, wherein the abbreviation of the at least second search term is operative as a second partial index;

determine a second interim result that is indexed by at least the partial index and the second partial index; and provide a result to the mobile device based on at least the second interim result and the context information.

19. The system of claim 17, wherein the search request message comprises a telephone area code associated with the mobile device.

20. The system of claim 17, wherein the search request message comprises the context information and the context information indicates a type of the result provided to the mobile device or a geographic feature.

21. The system of claim 17, wherein the search request message comprises a short code associated with a type of a service and wherein the result provided to the mobile device indicates a geographic location associated with the type of the service.

* * * * *